United States Patent

Keinath et al.

[11] 4,020,390
[45] Apr. 26, 1977

[54] SIDE PIN-CUSHION DISTORTION CORRECTION CIRCUIT

[75] Inventors: Rudolph Francis Keinath, LeRoy; David Eugene Manners, Alexander, both of N.Y.

[73] Assignee: GTE Sylvania Incorporated, Stamford, Conn.

[22] Filed: Sept. 29, 1975

[21] Appl. No.: 617,984

[52] U.S. Cl. .................. 315/371; 315/400
[51] Int. Cl.² ........................... H01J 29/56
[58] Field of Search ............. 315/370, 371, 400

[56] References Cited

UNITED STATES PATENTS

| | | | |
|---|---|---|---|
| 3,329,859 | 7/1967 | Lemke | 315/400 |
| 3,329,862 | 7/1967 | Lemke | 315/400 |
| 3,401,300 | 9/1968 | Pichler | 315/371 |
| 3,408,535 | 10/1968 | Lemke | 315/400 |
| 3,433,998 | 3/1969 | Wolber | 315/400 |
| 3,854,108 | 12/1974 | Horie et al. | 315/400 |

*Primary Examiner*—Maynard R. Wilbur
*Assistant Examiner*—T. M. Blum
*Attorney, Agent, or Firm*—Norman J. O'Malley; Thomas H. Buffton; Robert T. Orner

[57] ABSTRACT

Side pin-cushion distortion in the display system of a television receiver is corrected by circuitry which includes an "E" core saturable reactor having equal air gaps in a pair of outer legs and an ungapped center leg with a control winding fed by a vertical scan signal source affixed to the central leg and impedance windings fed by a horizontal scan signal source affixed to the outer legs whereby the inductance level of the outer legs is reduced while the change in inductance due to current changes in the control winding remains substantially constant.

7 Claims, 5 Drawing Figures

SIDE PIN-CUSHION DISTORTION CORRECTION CIRCUIT

BACKGROUND OF THE INVENTION

Generally, present-day television receivers have a cathode ray tube display system with a deflection angle of about 90°. Such display systems frequently employ a saturable reactor of the "E" core type to effect correction of side pin-cushion distortion. Moreover, the known saturable reactors utilized in such systems are of the "E" core type having three leg members with a substantially equal air gap in each one of the leg members.

When the leg members have equal air gaps a control winding may be affixed to either the outer or the center leg members with an impedance winding affixed to the unused leg members. In one known form of prior art structure a control winding is affixed to the outer leg members and a substantially parabolic-shaped waveform of current at the vertical scan frequency is applied thereto. An impedance winding is affixed to the center leg of the saturable reactor and a sawtooth-shaped potential at the horizontal scan frequency is applied thereto. This horizontal scan signal is modulated at the vertical scan rate to provide the desired side pin-cushion correction signals.

Although the above-mentioned "E" core type saturable reactor having equal air gaps in all of the leg members has proved satisfactory for effecting side pin-cushion correction in numerous applications, it has been found that there are other applications wherein such apparatus appears to be less than adequate. More specifically, it has been found that display systems which require alterations in deflection yoke configuration wherein the inductance of the yoke is altered with respect to the inductance of the "E" core saturable reactor no longer effect satisfactory side pin-cushion correction.

For example, it has been found that deflection systems having a 110 deflection angle require a deflection yoke of altered characteristics to effect the desired increase in deflection angle. However, the altered deflection yoke in combination with the above-mentioned "E" core saturable reactor tends to provide an inductance level in excess of the desired maximum and minimum levels. Although the overall inductance level can be reduced to the desired level by increasing the magnitude of the air gaps, it has been found that the increased air gap magnitude causes an undesired reduction in the amount of change of inductance effected by the control winding whereupon the desired side pin-cushion correction is no longer correctly effected.

While "E" core type saturable reactors with three leg members each having an equal gap have been satisfactory for deflection systems with a deflection angle of up to about 90°, it has been found that there are other applications, such as 110° deflection systems, wherein such apparatus does not appear to be quite adequate. For example, it has been found that a change in the inductance ratio of the yoke and saturable reactor has a deleterious effect upon the above-mentioned side pin-cushion correction. Moreover, a shift in such features as deflection angles, yoke structure such as "saddle to torroid," or cathode ray tube structure tend to accentuate the undesired shift in inductance ratios.

OBJECTS AND SUMMARY OF THE INVENTION

An object of the present invention is to provide an enhanced side pin-cushion distortion correction circuit for a cathode ray tube system. Another object of the invention is to provide improved saturable reactor type side pin-cushion distortion correction apparatus for a television receiver employing a cathode ray tube with a 110° deflection angle. Still another object of the invention is to reduce the level of inductance without reducing the rate of change of inductance of a saturable reactor employed in side pin-cushion correction apparatus of a televison receiver.

These and other and further objects, advantages and capabilities are achieved in one aspect of the invention by side pin-cushion correction apparatus having a saturable reactor with a center leg having no air gap and a pair of outside legs each having a substantially equal air gap with a control winding coupled to a source of vertical deflection signals and wound on the center leg and an impedance winding coupled to a source of horizontal deflection signals and wound on each of the outer legs whereby the inductance level of the impedance winding is reduced and the control over the minimum to maximum inductance level is maintained.

PREFERRED EMBODIMENT OF THE INVENTION

For a better understanding of the present invention, together with other and further advantages and capabilities thereof, reference is made to the following disclosure and appended claims in conjuction with the accompanying drawings.

Figure 1:
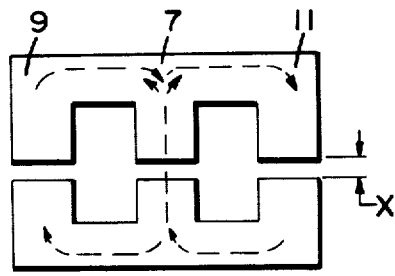
FIG. 1 is a diagrammatic illustration of a prior art form of "E" core type saturable reactor.

Referring to the drawings, FIG. 1 illustrates a prior art "E" core type of saturable reactor having a center leg member 7 and a pair of outer leg members 9 and 11 respectively. Each one of the leg members 7, 9, and 11 includes an air gap, designated X, and of equal magnitude. Also, a control winding (not shown) is wound on the center leg member 7 while an impedance winding (not shown) is wound on each of the outer leg members 9 and 11.

As is well known in the art, the flux developed by the winding on the center leg member 7 will divide substantially in equal amounts with one-half traversing the center leg member 7 and one outer leg member 9 and the other half traversing the center leg member 7 and the other outer leg member 11. Thus, each half of the flux developed by a winding on the center leg member 7 will see what amounts to two air-gaps, which may be designated 2X air gaps.

The windings on the outer leg members 9 will tend to develop a flux which progresses upwardly through the outer leg member 9, downwardly through the center leg member 7 and downwardly through the other outer leg member 11. Also, the winding on the other outer leg member 11 will tend to develop flux which progresses downwardly, through the outer leg member 11, upwardly through the center leg member 7, and upwardly through the other outer leg member 9. Thus, the flux through the center leg member 7 due to the windings on the outer leg members will cancel. The flux developed by the winding on each of the outer leg members 9 and 11 will tend to see what amounts to an air gap X in each of the outer leg members 9 and 11 or what may be designated a 2X air gap.

Figure 2:
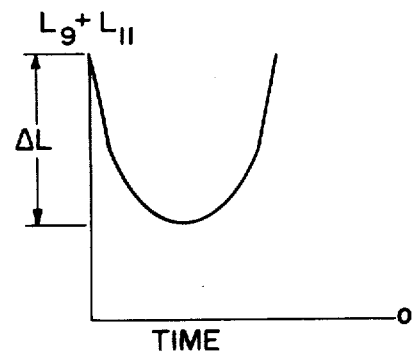
FIG. 2 is a curve illustrating the inductance effected by the structure of FIG. 1.

Although the above-mentioned apparatus does perform satisfactorily in numerous applications, it was found that an alteration in the ratio of the inductance of the deflection yoke with respect to the inductance of the saturable reactor tended to cause an undesired effect. As illustrated in FIG. 2, it was found that the initial level or the maximum and minimum level of inductance in the outer leg members, as plotted against a vertical scan time period, was undesirably high.

Additionally, it was found that the initial level of inductance could be reduced by increasing the magnitude of each of the air gaps, X, or by reducing the number of turns of the outer leg windings. However, such a reduction in inductance was undesirably accompanied by a decrease in the amount of inductance change, ΔL, obtainable with the center leg control winding and the available current flow. Also, it was found that the desired inductance level and amount of inductance change, ΔL, could be obtained by increased coil windings or core sizes both of which are undesirable due to increased cost and increased space required.

Figure 3:
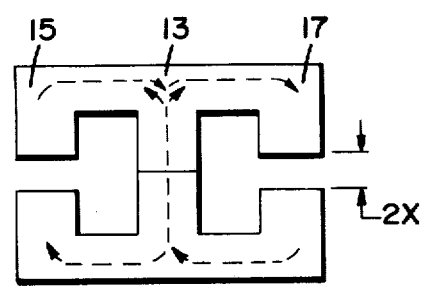
FIG. 3 is a diagrammatic illustration of a form of "E" core saturable reactor utilized in the present invention.

In FIG. 3, a saturable reactor is illustrated as having a center leg member 13 without an air gap therein and a pair of outer leg members 15 and 17 each having an increased air gap, designated 2X, therein. In this structure, each half of the flux developed by a control winding on the center leg member 13 sees what amounts to an air gap designated 2X as previously provided and described with respect to FIG. 1. However, the flux developed by the windings on the outer leg members 15 and 17 each see an air gap which may be designated 4X as compared with the air gap of 2X set forth with respect to FIG. 1.

Figure 4:
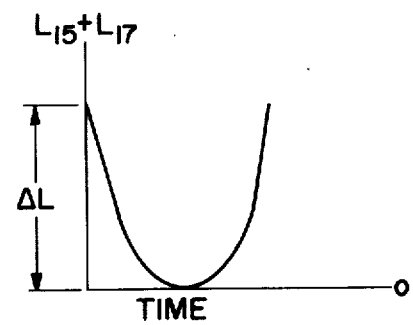
FIG. 4 is a curve illustrating the inductance effected by the structure of FIG. 3 as compared with the curve of FIG. 2.

Thus, the reluctance to flux flow in the outer leg members 15 and 17 is greatly increased causing the desired reduction of inductance level in the outer leg members 15 and 17, FIG. 4.

Moreover, the reluctance to flux flow developed by the control winding on the center leg member 13 remains substantially unchanged causing the amount of inductance change ΔL to remain substantially unaltered, FIG. 4.

Figure 5:
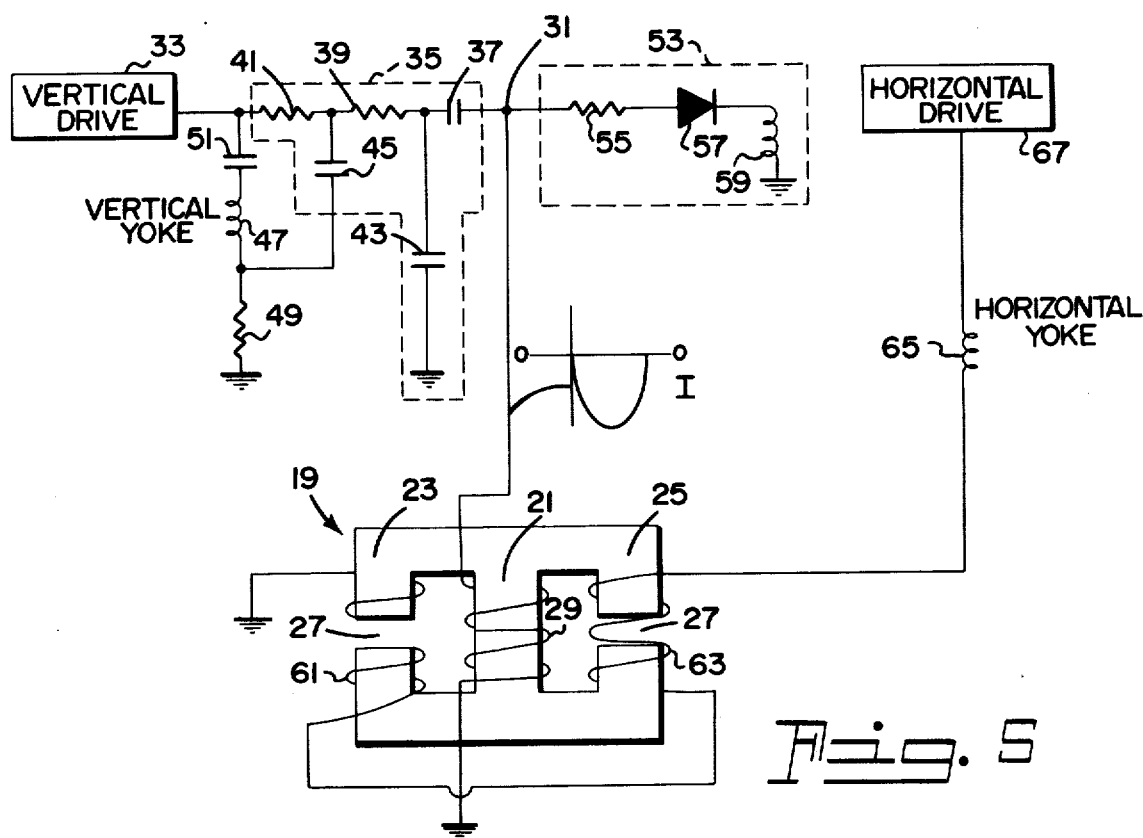
FIG. 5 is a schematic and diagrammatic illustration of a preferred apparatus for effecting side pin-cushion correction in a television receiver.

Referring to FIG. 5, side pin-cushion distortion correction apparatus for a television receiver includes a saturable reactor 19 having an "E" shaped core with a center leg member 21 and a pair of outer leg members, 23 and 25 respectively. The center leg member 21 has no gap therein while the outer leg members 23 and 25 each have a substantially equal gap 27 of a 2X magnitude.

A control winding 29 is wound on the center leg member 21. One end of the control winding is connected to a potential reference level such as circuit ground and the other end of the control winding is connected to a junction 31. The junction 31 is connected to a source of vertical drive signals 33 by way of a wave-shaping network 35 including a capacitor 37 and a pair of resistors 39 and 41 series coupling the junction 31 and vertical drive signal source 33. A capacitor 43 couples the capacitor 37 and resistor 39 to circuit ground. Another capacitor 45 couples the junction of the resistors 39 and 41 to the junction of a vertical deflection yoke winding 47 and a resistor 49 connected to circuit ground. The vertical deflection yoke winding 47 is coupled by a capacitor 51 to the vertical drive signal source 33.

The junction 31 is also connected to a DC bias network 53 which may be in any one of a number of well-known forms. Herein, the DC bias network 53 includes a series connected resistor 55, diode 57, and a winding 59 connected to circuit ground and associated with the horizontal flyback transformer of the television receiver.

An impedance winding includes a pair of series connected equal portions 61 and 63. The first portion 61 of the impedance winding is affixed to the one outer leg member 23 and connected to circuit ground. The other portion 63 of the impedance winding is wound on the other outer leg member 25 and series connects the first portion 61 of the impedance winding to a horizontal deflection yoke winding 65 coupled to a horizontal drive signal source 67.

As to operation, the vertical drive signal source 33 provides a substantially sawtooth-shaped potential which is integrated to effect a substantially parabolic-shaped waveform of current appearing at the junction 31. This parabolic-shaped waveform of current appearing at the junction 31 is shifted by the addition of a DC potential available from the DC bias network 53. Thus, a substantially parabolic-shaped current, waveform 69, at the vertical scan rate is applied to the control winding 29 of the saturable reactor 19.

Also, a sawtooth-shaped current at the horizontal scan rate is applied to both portions 61 and 63 of the impedance windings affixed to the outer leg members 23 and 25 of the saturable reactor 19. This sawtooth-shaped current at the horizontal scan rate is modulated at the vertical scan rate of the current flowing through the control winding 29 to provide the desired correction of side pin-cushion distortion. In other words, varying the current flow in the control winding 29 alters the flux in the core of the reactor 19 which varies the inductance of the windings 61 and 63 on the outer leg members 23 and 25. Thus, the horizontal signals are vertically modulated and side pin-cushion distortion is corrected.

As an example, but in no way to be construed as limiting the invention, the following component values were found appropriate to FIG. 5:

| Reactor 19 core | 3/8" stackpole 24B Ferrite | |
|---|---|---|
| Control Winding 29 | 238 mh. | 17.7 ohms |
| | 750 turns | No. 31 wire |
| Impedance Winding 61, 63 | 57.2 uh | 0.056 ohms |
| | 12.5 turns (each) | No. 24 wire |
| Air Gap | 13.5 mils (each) | |
| Capacitor | 37 | 650 mfd |
| | 43 | 200 mfd |
| | 45 | 1 mfd |
| | 57 | 5 mfd |
| Resistor | 39 | 19.0 ohms |
| | 41 | 3.3 ohms |
| | 49 | 0.39 ohms |
| | 55 | 33.0 ohms |

Thus, there has been provided a unique apparatus for effecting side pin-cushion distortion correction for the display system of a television receiver. The apparatus includes an improved saturable reactor especially suitable for operation with 110° deflection systems requiring deflection yokes appropriate to such wide angle deflection. Moreover, the apparatus not only provides the desired level of inductance without increase in current flow, winding turns, or power consumption but also provides the desired amount of inductance change.

While there has been shown and described what is at present considered the preferred embodiment of the invention, it will be obvious to those skilled in the art that various changes and modifications may be made therein without departing from the invention as defined by the appended claims.

What is claimed is:

1. In a television receiver having a cathode ray tube with a deflection angle of at least 90°, a DC potential source, horizontal and vertical deflection signal sources, and horizontal and vertical deflection yoke windings associated with the cathode ray tube and coupled to the horizontal and vertical deflection signal sources, a side pin-cushion distortion correction circuit comprising:
   a saturable reactor having a two-window core with a solid center leg member and a pair of outer leg members, each of said outer leg members having an air-gap therein to provide a reluctance to flux flow in said outer leg members twice as great as the reluctance to flux flow in said solid center leg member and one of said outer leg members;
   a control winding disposed on said center leg member and coupled to said vertical deflection signal source and to said DC potential source; and
   an impedance winding equally disposed on each of said pair of outer leg members and coupled to said horizontal deflection yoke winding and to a potential reference level for providing a substantially parabolic-shaped correction of pin-cushion distortion at said cathode ray tube.

2. The pin-cushion distortion correction circuit of claim 1 wherein said impedance windings on each of said pair of outer leg members and the current flow therethrough are chosen to provide cancellation of flux at the horizontal frequency in said center leg member.

3. The pin-cushion distortion correction circuit of claim 1 wherein said gaps in each of said outer leg members are substantially similar.

4. The pin-cushion distortion correction circuit of claim 1 wherein said control winding is parallel connected with said vertical deflection yoke winding intermediate said vertical deflection signal source and a potential reference level.

5. A side pin-cushion distortion correction circuit for a television receiver having a cathode ray tube comprising;
   a saturable reactor having a two-window core with a non-gap center leg member and a pair of outer leg members each having a substantially similar air-gap therein to provide a reluctance to flux flow in said outer leg members twice as great as the reluctance to flux flow in said center leg member and one of said outer leg members;
   control winding means wound on said center leg member and connected to a source of vertical deflection signals; and
   impedance winding means wound on said outer leg members and connected to a source of horizontal deflection signals whereby inductance in said outer leg members is decreased and the change in inductance of said outer leg members with current change in said control winding remains substantially constant.

6. The side pin-cushion correction circuit of claim 5 wherein said saturable reactor is formed to substantially double the reluctance to flux flow in said outer leg members with respect to the reluctance to flux flow in said center and one of said outer leg members.

7. The side pin-cushion correction circuit of claim 5 including a DC bias potential means coupled to said control winding for shifting the reference level of said potential applied to said control winding from said source of vertical deflection signals.

* * * * *